(12) United States Patent
Gao et al.

(10) Patent No.: US 12,175,352 B2
(45) Date of Patent: Dec. 24, 2024

(54) METHOD FOR EVALUATING MECHANICAL STATE OF HIGH-VOLTAGE SHUNT REACTOR BASED ON VIBRATION CHARACTERISTICS

(71) Applicants: State Grid Hebei Electric Power Research Institute, Hebei (CN); State Grid Corporation of China, Beijing (CN); Xi'an Jiaotong University, Shaanxi (CN)

(72) Inventors: Shuguo Gao, Hebei (CN); Lingming Meng, Hebei (CN); Siming Zeng, Hebei (CN); Hui Fan, Hebei (CN); Qian Zang, Hebei (CN); Boyan Jia, Hebei (CN); Shengchang Ji, Shaanxi (CN); Hongliang Liu, Hebei (CN); Lu Sun, Hebei (CN); Chao Xing, Hebei (CN); Jun Zhao, Hebei (CN)

(73) Assignees: State Grid Hebei Electric Power Research Institute, Shijiazhuang (CN); State Grid Corporation of China, Beijing (CN); Xi'an Jiaotong University, Xi'an (CN)

( * ) Notice: Subject to any disclaimer, the term of this patent is extended or adjusted under 35 U.S.C. 154(b) by 910 days.

(21) Appl. No.: 17/244,947

(22) Filed: Apr. 29, 2021

(65) Prior Publication Data
US 2021/0364481 A1 Nov. 25, 2021

Related U.S. Application Data

(63) Continuation-in-part of application No. PCT/CN2020/118210, filed on Sep. 27, 2020.

(30) Foreign Application Priority Data

May 20, 2020 (CN) .......................... 202010432433.X

(51) Int. Cl.
*G06N 3/0442* (2023.01)
*G01H 1/00* (2006.01)
*G06N 3/048* (2023.01)

(52) U.S. Cl.
CPC ............. *G06N 3/0442* (2023.01); *G01H 1/00* (2013.01); *G06N 3/048* (2023.01)

(58) Field of Classification Search
CPC .......................... G06N 3/0442; G06N 3/048
See application file for complete search history.

(56) References Cited

U.S. PATENT DOCUMENTS

2018/0284752 A1* 10/2018 Cella ...................... G06N 3/088

FOREIGN PATENT DOCUMENTS

CN  105806467 A  *  3/2016
CN  110175425 A  *  8/2019
(Continued)

OTHER PUBLICATIONS

Jiejie Dai, Research on Transformer State Assessment Based on Deep Learning, Chinese Doctoral Dissertations Full-text Database, Engineering Science and Technology II, Jan. 15, 2020, pp. 57-67, vol. 1 of Year 2020.

*Primary Examiner* — Barbara M Level

(57) ABSTRACT

A method for evaluating the mechanical state of a high-voltage shunt reactor based on vibration characteristics is disclosed, relating to the technical field of electrical equipment fault diagnosis. The method includes: based on historical state data and real-time vibration and noise signal data of the high-voltage shunt reactor and through an LSTM neural network time series prediction method, comparing deviation between predicted characteristic value and actual characteristic value, and determining whether the high-voltage shunt reactor has mechanical defects or failures. By using the historical state data and the real-time vibration and noise signal data of the high-voltage shunt reactor, an LSTM (Continued)

neural network time series prediction method, as well as comparison of the deviation between the predicted characteristic value and the actual characteristic value, etc., the evaluation of the mechanical state of the high-voltage shunt reactor is realized.

7 Claims, 11 Drawing Sheets

(56) References Cited

FOREIGN PATENT DOCUMENTS

| | | | |
|---|---|---|---|
| CN | 110361207 A | * | 10/2019 |
| CN | 110441632 A | * | 11/2019 |
| CN | 110534118 A | | 12/2019 |
| CN | 111024347 B | * | 4/2020 |

* cited by examiner

METHOD FOR EVALUATING MECHANICAL STATE OF HIGH-VOLTAGE SHUNT REACTOR BASED ON VIBRATION CHARACTERISTICS

CROSS REFERENCE TO RELATED APPLICATIONS

The present application is a Continuation-In-Part Application of PCT Application No. PCT/CN2020/118210 filed on Sep. 27, 2020, which claims the benefit of Chinese Patent Application No. 202010432433.X filed on May 20, 2020. All the above are hereby incorporated by reference in their entirety.

FIELD

The disclosure relates to the technical field of electrical equipment fault diagnosis, in particular to a method for evaluating the mechanical state of a high-voltage shunt reactor based on vibration characteristics.

BACKGROUND

High-voltage shunt reactors are important reactive power compensation equipment in the power system, which play an important role in the safe and stable operation of the power system. The voltage level of the high-voltage shunt reactor is above 500 kV. In recent years, there have been many high-voltage shunt reactors in an abnormal state or malfunctioned across the country, so it is of great significance to carry out fault diagnosis for high-voltage shunt reactors. According to the disassembly report of the high-voltage shunt reactor that failed, the main form of failure of the high-voltage shunt reactor is the loosening of internal fasteners, which generates a local suspension potential and in turn generates abnormal partial discharges, increases acetylene, and ultimately leads to equipment shutdown.

According to relevant data, the current commonly state evaluation methods for the high-voltage shunt reactor include oil chromatography, ultra-high frequency method, and ultrasonic method. These methods show high accuracy in the diagnosis of the late stage (insulation defects occur) of the high-voltage shunt reactor failure, but is difficult to diagnose in time for early mechanical failures. The vibration method uses the vibration signals on the surface of the oil tank of the high-voltage shunt reactor to detect its mechanical state, and has the advantages of online, non-intrusive and sensitive to early mechanical failures. Related scientific research institutions and enterprises have developed a wide range of online monitoring instruments for the high-voltage shunt reactor based on vibro-acoustic signals, and realize the real-time observation and recording of the vibration signals of the oil tank surface of the high-voltage shunt reactor. However, the surface vibration signals of high-voltage shunt reactors of different voltage levels and different manufacturers are different. Even for the same type of high-voltage shunt reactors produced by the same manufacturer, due to the production process control and the complexity of the mechanical system of the high-voltage shunt reactor itself, the vibration signals will also be different; and for a particular high-voltage shunt reactor, at different operation stages, the vibration signals will also change with the increase of operating years and fluctuations of environmental factors. The current diagnostic evaluation methods do not fully consider the operating characteristics of the observed high-voltage shunt reactor in different time dimensions, and the selection of its typical healthy vibration signal set and typical fault vibration signal set and the establishment of criteria are often based on statistics from a small laboratory model experiment and experience results or other statistical results related to the reactors in operation, bringing certain difficulties to the evaluation of the state of the high-voltage shunt reactor.

Therefore, for the evaluation of the mechanical state of the high-voltage shunt reactor based on the vibration signals, it is of great significance to invent a method for evaluating the vibration characteristics of the high-voltage shunt reactor, which comprehensively utilizes the equipment body to obtain the characteristic data that changes with time, and its criteria is personalized and adaptive to the current operating environment and operating life. This method has a solid engineering background and broad application prospects.

Existing Technical Problems and Thinking how to solve the technical problem of mechanical state evaluation of the high voltage shunt reactor.

SUMMARY

The present disclosure aims to provide a method for evaluating the mechanical state of a high-voltage shunt reactor based on vibration characteristics. By using the historical state data and the real-time vibration and noise signal data of the high-voltage shunt reactor, an LSTM neural network time series prediction method, as well as comparison of the deviation between the predicted characteristic value and the actual characteristic value, etc., the method realizes the evaluation of the mechanical state of the high-voltage shunt reactor.

In order to solve the above technical problems, the technical solution adopted by the present disclosure is: a method for evaluating the mechanical state of a high-voltage shunt reactor based on vibration characteristics, which, based on historical state data and real-time vibration and noise signal data of the high-voltage shunt reactor and through an LSTM neural network time series prediction method and comparison of the deviation between the predicted characteristic value and the actual characteristic value, determines whether the high-voltage shunt reactor has mechanical defects or failures.

A further technical solution is to collect vibration signals and noise signals on a surface of an oil tank of the high-voltage shunt reactor, extract characteristic values in the signals and form a time series, combine with a time series prediction model to calculate a comprehensive deviation factor between a predicted value and an actual value, and determine whether mechanical defects or failures with unnatural trends occur inside the oil tank of the high-voltage shunt reactor by the comprehensive deviation factor.

A further technical solution is that fundamental frequency amplitudes of the vibration signals and the noise signals on the surface of the oil tank of the high-voltage shunt reactor are used as characteristic variables.

A further technical solution is to take 30 minutes as a sampling period to collect the vibration signals and the noise signals on the surface of the oil tank of the high-voltage shunt reactor.

A further technical solution is to predict vibration characteristic values of the high-voltage shunt reactor for a period of time in the future through the LSTM neural network.

A further technical solution is to calculate, based on prediction result of the vibration characteristics of the LSTM neural network, a comprehensive deviation factor between the predicted characteristic value and the actual characteristic value, and using the comprehensive deviation factor as a state evaluation index.

A further technical solution includes: S1: collecting vibration signals and noise signals of a high-voltage shunt reactor and performing data preprocessing; S2: establishing an LSTM neural network model and setting parameters; S3: predicting signal fundamental frequency amplitudes by using an LSTM neural network; S4: evaluating operating state of the high-voltage shunt reactor by using the comprehensive deviation factor. Specific steps of S2 include S201: determining the number of neurons in an input layer, a hidden layer and an output layer; and S202: constructing a prediction model.

S2: establish an LSTM neural network model and set parameters.

S201: determine the number of neurons of an input layer, a hidden layer and an output layer.

Determine that the number of neurons of the input layer is 480, the output layer is 48, and the hidden layer is 24 in the neural network.

S202: construct a prediction model.

The neural network model is constructed in the form of multi-step training on the data. The steps have time-series relationship. The notable characteristic is that in each iteration, an output with current information is used as a portion of the input for the next time step.

A further technical solution is that the specific steps of S1 include: S101: arranging measuring points; S102: collecting equipment; S103: collection period; S104: extracting characteristics from the signals; and S105: filtering a characteristic sequence.

S1: collect vibration signals and noise signals of a high-voltage shunt reactor and perform data preprocessing.

S101: arrange measuring points.

Fix a first vibration sensor of a first channel on a front face of a high-voltage shunt reactor box, fix a second vibration sensor of a second channel on a side face of the high-voltage shunt reactor box, fix a third vibration sensor of a third channel on a back of the high-voltage shunt reactor box, and fix a microphone of a fourth channel in front of the front face of the high-voltage shunt reactor box to form four measuring points.

S102: collecting equipment.

Connect the first vibration sensor to a first channel of a capture card through a cable, connect the second vibration sensor to a second channel of the capture card through a cable, connect the third vibration sensor to a third channel of the capture card through a cable, connect the microphone to a fourth channel of the capture card through a cable, and connect the capture card to a computer through a data cable.

S103: collection period.

Take 30 minutes as a collection period to collect the vibration signals of three measuring points and the noise signals of one measuring point.

S104: extract characteristics from the signals.

Perform Fast Fourier transform on the signals collected through the four channels to extract the fundamental frequency amplitudes. Each set of fundamental frequency amplitudes forms a characteristic sequence, and four sets of fundamental frequency amplitudes form a total of four characteristic sequences. The sequence form of each channel is: $f(s)=\{f_1, f_2, \ldots f_s\}$.

S105: filter the characteristic sequence.

Filter the time series of the four channels, and use the filtered result as an input of the LSTM neural network. The combined filter is defined as follows:

$$y(s) = \frac{[OC(f(s)) + CO(f(s))]}{2} \quad (1)$$

In Formula (1), f(s) is a fundamental frequency characteristic sequence before filtering for each channel, without unit and in the form of a vector, and each characteristic sequence is directly obtained through signal collection and fast Fourier transform; y(s) is obtained by filtering the original characteristic sequence with the above-mentioned formula, without unit and in the form of a vector; OC is an open-closed morphological filtering form, and CO is a closed-open morphological filtering form.

A further technical solution is that the specific steps of S3 include: S301: inputting sequence; S302: determining a learning rate, the number of iterations and an error standard; S303: determining a current time forget gate; S304: determining a current time input gate; S305: determining current time candidate information; S306: determining information to be retained in the current time candidate information; S307: determining a current time cell state; S308: determining a current time output gate; and S309: predicting a characteristic sequence.

S3: use an LSTM neural network to predict signal fundamental frequency amplitudes.

S301: input sequences.

Take the sequences filtered in step S105 as input.

S302: determine a learning rate, the number of iterations and an error standard.

Determine that the neural network learning rate is 0.001, the number of iterations is 5000, and the error standard is 0.00001.

S303: determine a current time forget gate.

In the prediction process, the forget gate in the time series prediction model determines information to be forgotten and information to be retained after receiving information transmitted from the previous cell state $C_{t-1}$, and its output is as follows:

$$f_t = \sigma(W_f x_t + U_f h_{t-1} + b_f) \quad (2)$$

In Formula (2), $f_t$ is the forget gate for filtering the information that needs to be retained and the information that needs to be forgotten in the previous time information, without unit and in the form of numerical value; $x_t$ is the current time input in the characteristic sequence, without unit and in the form of numerical value; $h_{t-1}$ is previous time output result, without unit and in the form of numerical value; $W_f$ is weight value of the current time input $x_t$, without unit and in the form of numerical value; $U_f$ is the weight value of the previous time output $h_{t-1}$, in the form of numerical value; $b_f$ is the offset for calculating the forget gate, without unit and in the form of numerical value; σ is the sigmoid activation function for mapping the variables to between 0 and 1, and the formula is:

$$\sigma(j) = \frac{1}{1+e^{-j}} \quad (3)$$

In Formula (3), j is the independent variable of the sigmoid activation function, without unit and in the form of numerical value; σ(j) is the mapping result of the independent variable j, and its range is between 0 and 1, without unit and in the form of numerical value.

S304: determine the current time input gate.

The input gate in the time series prediction model determines the information to be input after receiving information of the current time input $x_t$ and the previous time output $b_{t-1}$, namely, $$i_t = \sigma(W_i x_t + U_i h_{t-1} + b_i) \tag{4}$$

In Formula (4), $i_t$ is the input gate for filtering information that needs to be retained and information that needs to be deleted in the current time information, without unit and in the form of numerical value; $W_i$ is the weight value of the current time input $x_t$, $U_1$ is the weight value of the previous time output $h_{t-1}$; $b_i$ is the offset for calculating the input gate, without unit and in the form of numerical value; $\sigma$ is the sigmoid activation function for mapping the variables to between 0 and 1.

S305: determine current candidate information.

$$\tilde{C}_t = \tanh(w_c x_t + U_c h_{t-1} + b_c) \tag{5}$$

In Formula (5), $\tilde{C}_t$ denotes the current time candidate information, without unit and in the form of numerical value; $\tilde{C}_t$ contains information of the current time input $x_t$ and the previous time output $h_{t-1}$; $W_c$ is the weight value of the current time input $x_t$, without unit and in the form of numerical value; $U_c$ is the weight value of the previous time output $h_{t-1}$; $b_c$ is the offset for calculating the current candidate information, without unit and in the form of numerical value; tanh is the activation function, the calculation result is between −1 and 1, and the formula is:

$$\tanh(k) = \frac{e^k - e^{-k}}{e^k + e^{-k}} \tag{6}$$

In Formula (6), k is the independent variable of the tanh activation function; tanh(k) is the mapping result of the independent variable k, and its range is between −1 and 1.

S306: Determine the information to be retained in the current time candidate information.

The input gate $i_t$ and the candidate information $\tilde{C}_t$ are multiplied to obtain the retained information and store the information in the cell state Ct of the input gate.

S307: Determine the current time cell state.

Update the current time storage cell state, which combines the information of the candidate cell state $\tilde{C}_t$ with the information of the previous time state $\tilde{C}_{t-1}$; the current time storage cell state is as follows:

$$C_t = f_t * C_{t-1} + i_t * \tilde{C}_t \tag{7}$$

In Formula (7), $C_t$ is the current time storage cell state, without unit and in the form numerical value; $f_t$ is the forget gate, in the form numerical value; $C_{t-1}$ is the previous time storage cell state, without unit and in the form numerical value; $i_t$ is the input gate, without unit and in the form numerical value; $\tilde{C}_t$ is the current time candidate state, without unit and in the form numerical value.

S308: determine the current time output gate.

The output gate in the time series prediction model determines the information to be output after receiving the information of the current time input $x_t$ and the previous time output $h_{t-1}$, that is, the output gate:

$$o_t = \sigma(W_o x_t + U_o h_{t-1} + b_o) \tag{8}$$

In Formula (8), $o_t$ is the output gate for filtering the information that needs to be output from the current time information, without unit and in the form of numerical value; $W_o$ is the weight value of the current time input $x_t$; $U_o$ is the weight value of the previous time output $h_{t-1}$; $h_o$ is the offset for calculating the output gate, without unit and in the form of numerical value; $\sigma$ is the sigmoid activation function for mapping the variables to between 0 and 1;

then the current time output is:

$$h_t = o_t * \tanh(C_t) \tag{9}$$

In Formula (9), $h_t$ is the current time output, without unit and in the form numerical value; $C_t$ is the current time storage cell state, without unit and in the form numerical value; $o_t$ is the output gate, without unit and in the form numerical value; tanh is the activation function for mapping the variables to between 0 and 1.

S309: predict the characteristic sequence.

Before the network reaches the preset number of iterations, if the error between $h_t$ in S308 and the true value is not less than the error threshold, update the network weight value and repeat steps S301-S308; before the network reaches the preset number of iterations, if the error between $h_t$ in S308 and the true value is less than the error threshold, or the network reaches the preset number of iterations, a predicated characteristic sequence is calculated by the neural network, and the calculation formula is as follows:

$$F = \{f_1, f_2, \ldots f_i\} \tag{10}$$

In Formula (10), F is the predicated characteristic sequence calculated by the prediction model, in the form of a one-dimensional sequence; i is the value of the time corresponding to the sequence, and the time i increases every 30 minutes according to the collection period of the collected signal; and $f_i$ is the value corresponding to the characteristic of the $i^{-th}$ time in the sequence F.

A further technical solution is that: the using the comprehensive deviation factor to evaluate the operating state of the high-voltage shunt reactor of S4 includes: S401: calculating the comprehensive deviation factor, S402: determining whether the comprehensive deviation factor is greater than the threshold, and S403: alarming or repeating the above steps.

S4: use the comprehensive deviation factor to evaluate the operating state of the high-voltage shunt reactor.

S401: calculate the comprehensive deviation factor.

$$M = \{m_1, m_2, \ldots m_i\} \tag{11}$$

In Formula (11), M is the true characteristic sequence, in the form of a one-dimensional sequence; i is the value of the time corresponding to the sequence, and the time i increases every 30 minutes according to the collection period of the collected signal; $m_i$ is the value corresponding to the characteristic of the $i^{-th}$ time in the sequence M. Each value in the sequence M is obtained by the filtering in step S105.

Compare the predicted sequence $F_i = \{f_1, f_2, \ldots f_i\}$ with the actual sequence to be studied $M_i = \{m_1, m_2, \ldots m_i\}$, and calculate the comprehensive deviation factor h; the comprehensive deviation factor is defined as follows:

$$h = \sum_{i=1}^{p} \left| \frac{f_i - m_i}{p m_i} \right| \tag{12}$$

In Formula (12), h is the comprehensive deviation factor calculated from the predicted sequence $\{f_1, f_2, \ldots f_i\}$ and the real sequence $\{m_1, m_2, \ldots m_i\}$, without unit and in the form of numerical value; i is the subscript of the two sequences, without unit and in the form of numerical value, which are the same as those in Formula (10) and Formula (11); p is the sequence length, without unit and in the form of numerical value.

S402: determine whether the comprehensive deviation factor is greater than a threshold.

If h is greater than an upper limit $h_{max}$ of the comprehensive deviation factor, it indicates that the characteristics of the vibration signal deviate greatly from the ideal value, and the internal fastening components of the high-voltage shunt reactor have a certain defect and an alarm is issued. The recommended value range for $h_{max}$ is [0.05, 0.15].

S403: alarm or repeat the above steps.

If the comprehensive deviation factor h is less than the upper limit $h_{max}$ of the comprehensive deviation factor, continue to collect data, and perform the step S1 based on the current data.

The beneficial effects produced by using the above technical solutions are as follows.

A method for evaluating the mechanical state of a high-voltage shunt reactor based on vibration characteristics, which, based on historical state data and real-time vibration and noise signal data of the high-voltage shunt reactor and through an LSTM neural network time series prediction method and comparison of the deviation between the predicted characteristic value and the actual characteristic value, determines whether the high-voltage shunt reactor has mechanical defects or failures. By the historical state data and real-time vibration and noise signal data of the high-voltage shunt reactor and the LSTM neural network time series prediction method and comparison of the deviation between the predicted characteristic value and the actual characteristic value, the evaluation of the mechanical state of a high-voltage shunt reactor is achieved.

Details are described in the following detailed description.

DETAILED DESCRIPTION

The technical solutions in the embodiments of the present application will be described clearly and completely in conjunction with the accompanying drawings in the embodiments of the present application. Obviously, the described embodiments are only a part of the embodiments of the present application, rather than all the embodiments. The following description of at least one exemplary embodiment is actually only illustrative, and in no way serves as any restriction on the application and its application or use. Based on the embodiments in this application, all other embodiments obtained by those of ordinary skill in the art without creative work fall within the protection scope of the application.

In the following description, many specific details are explained in order to fully understand the application, but the application can also be implemented in other ways different from those described here, and those skilled in the art can do similar promotion without departing from the connotation of the application. Therefore, the application is not limited by the specific embodiments disclosed below.

Figure 1:
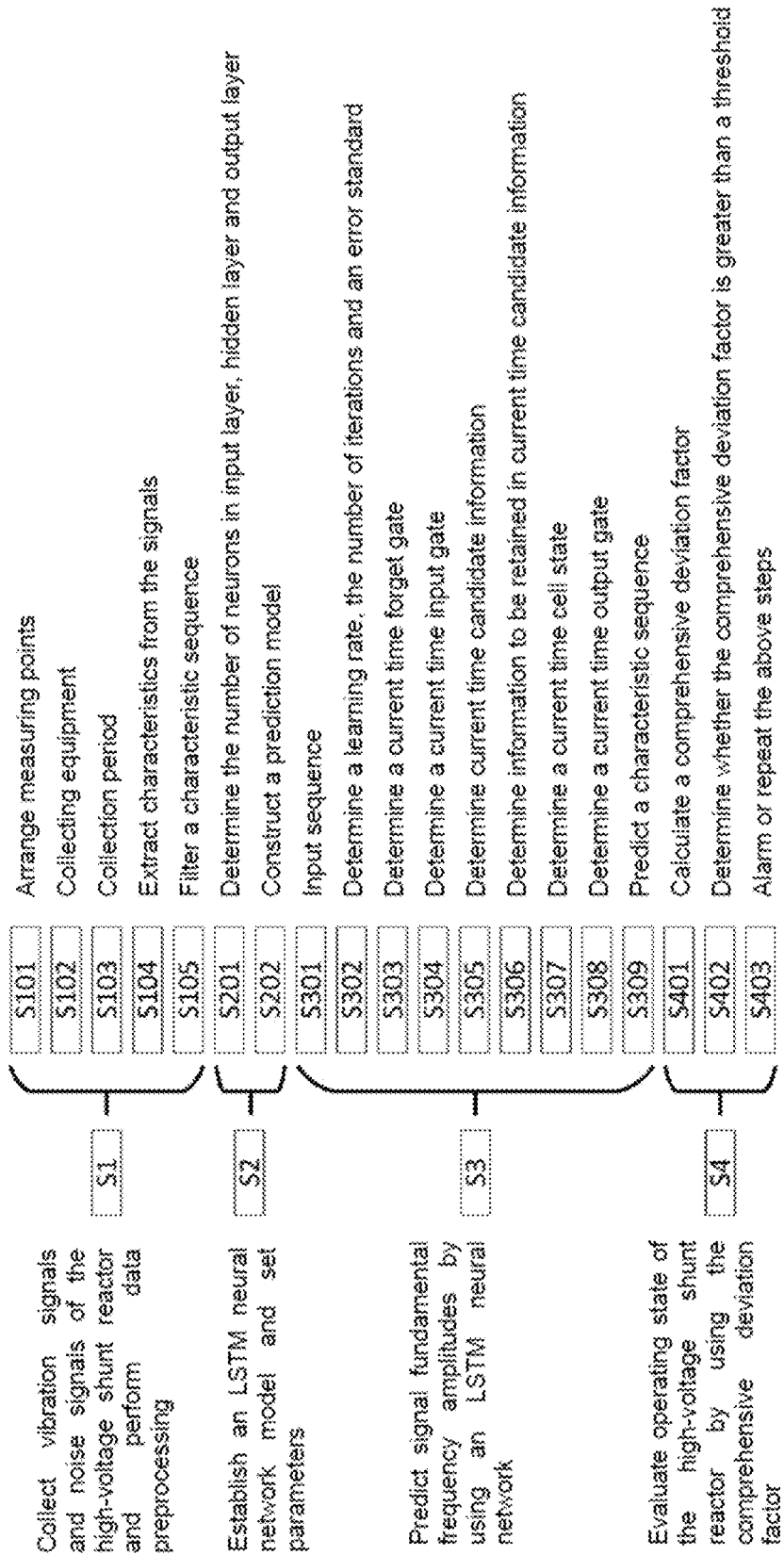
FIG. 1 is a flowchart of the present disclosure.
Figure 2:
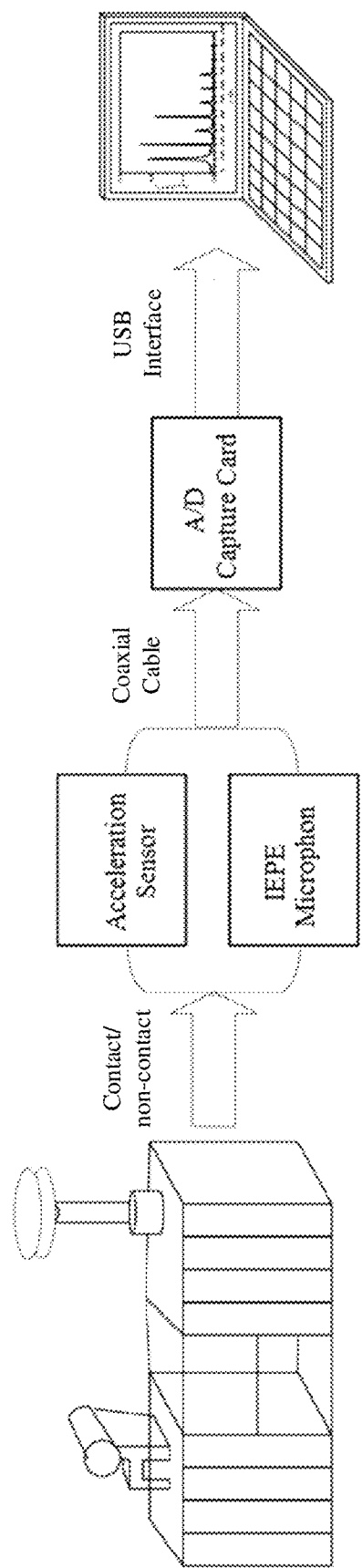
FIG. 2 is a block diagram of the signal acquisition system used in the present disclosure.
Figure 3:
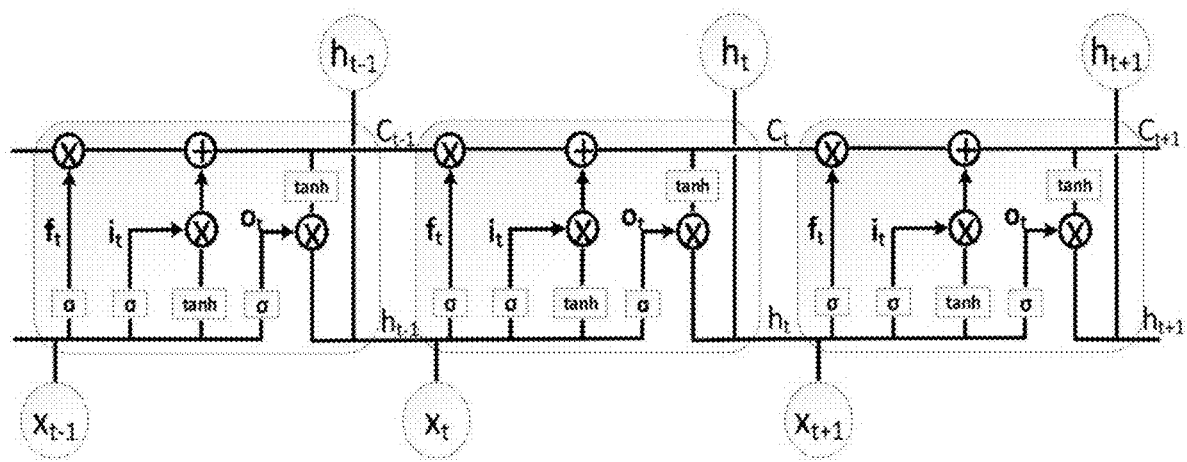
FIG. 3 is a structural diagram of the LSTM neural network in the present disclosure.

As illustrated in FIGS. 1-3, a method for evaluating the mechanical state of a high-voltage shunt reactor based on vibration characteristics is disclosed. The method includes: S1: collecting vibration signals and noise signals of a high-voltage shunt reactor and performing data preprocessing; S2: establishing an LSTM neural network model and setting parameters; S3: predicting signal fundamental frequency amplitudes by using an LSTM neural network; S4: evaluating operating state of the high-voltage shunt reactor by using a comprehensive deviation factor. Details are as follows.

S1: collect vibration signals and noise signals of a high-voltage shunt reactor and perform data preprocessing.

S101: arrange measuring points.

Fix a first vibration sensor of a first channel on a front face of a high-voltage shunt reactor box, fix a second vibration sensor of a second channel on a side face of the high-voltage shunt reactor box, fix a third vibration sensor of a third channel on a back of the high-voltage shunt reactor box, and fix a microphone of a fourth channel in front of the front face of the high-voltage shunt reactor box to form four measuring points.

S102: collecting equipment.

Figure 4:
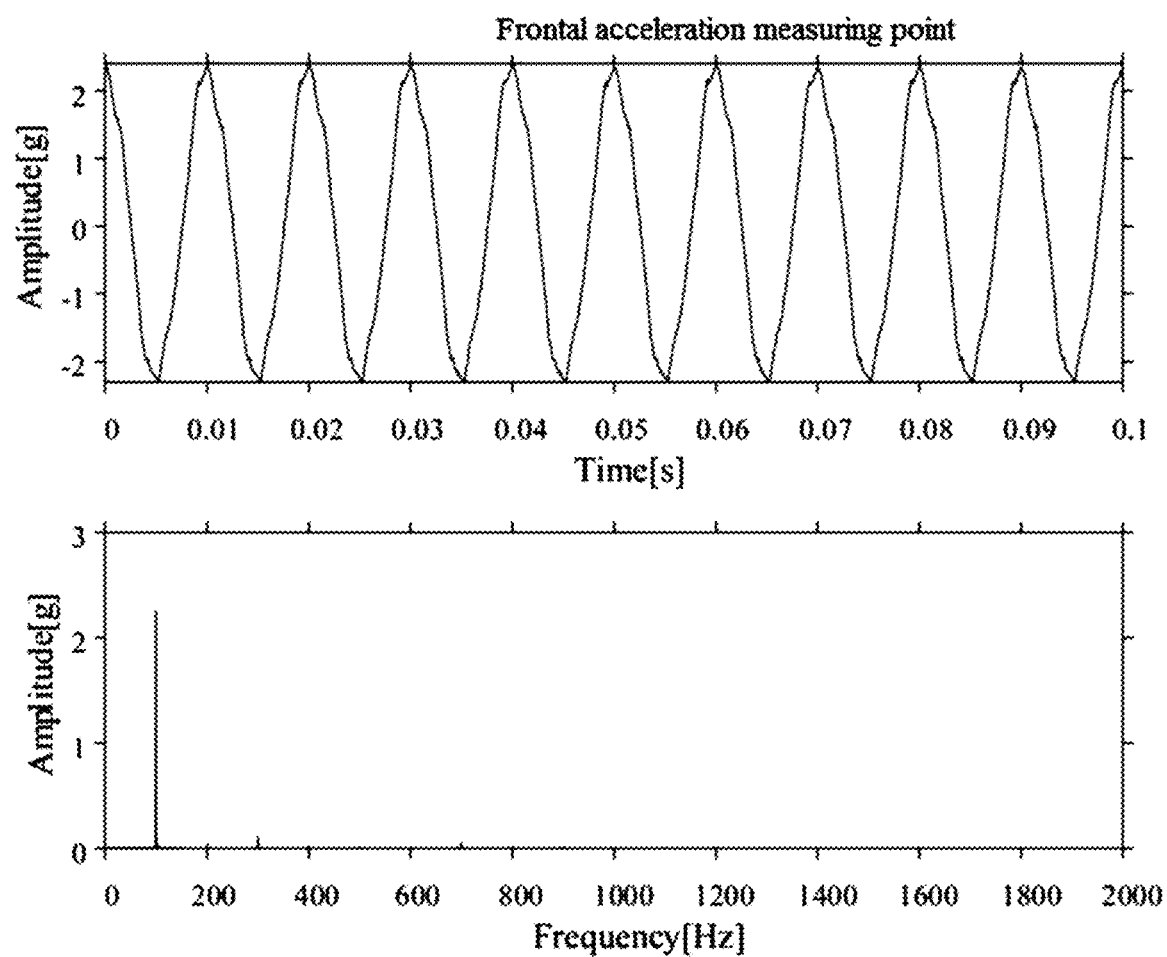
FIG. 4 is a screenshot of the vibration signal of the first channel in the present disclosure.
Figure 5:
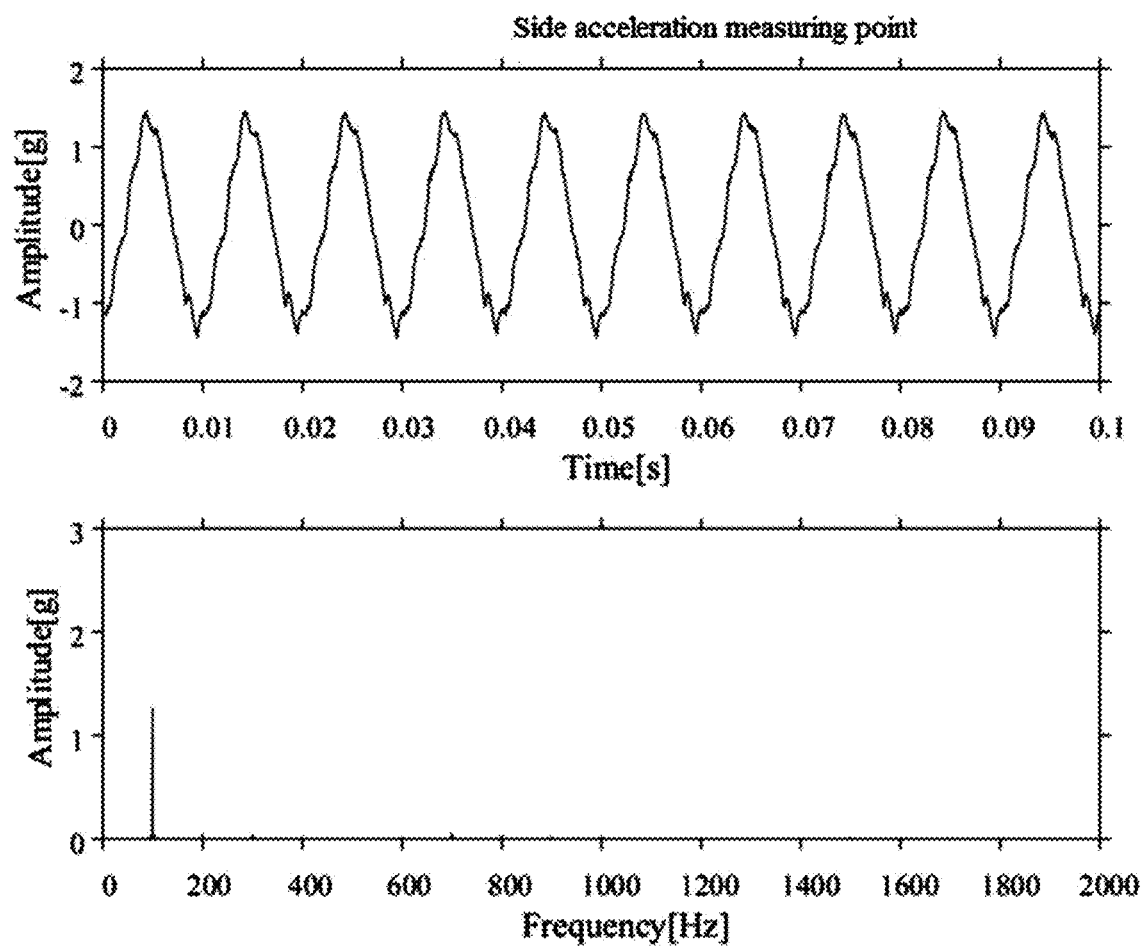
FIG. 5 is a screenshot of the vibration signal of the second channel in the present disclosure.
Figure 6:
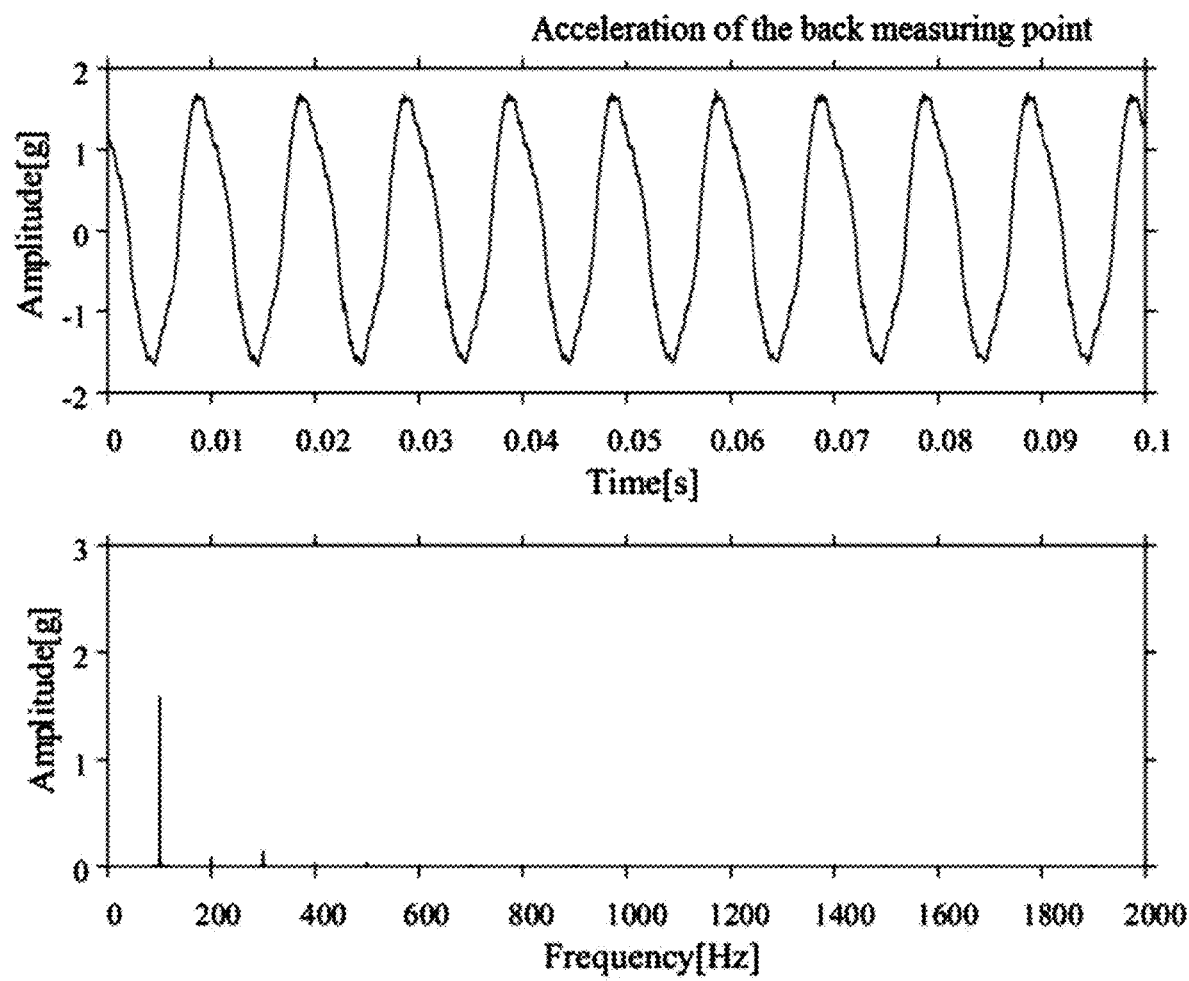
FIG. 6 is a screenshot of the vibration signal of the third channel in the present disclosure.
Figure 7:
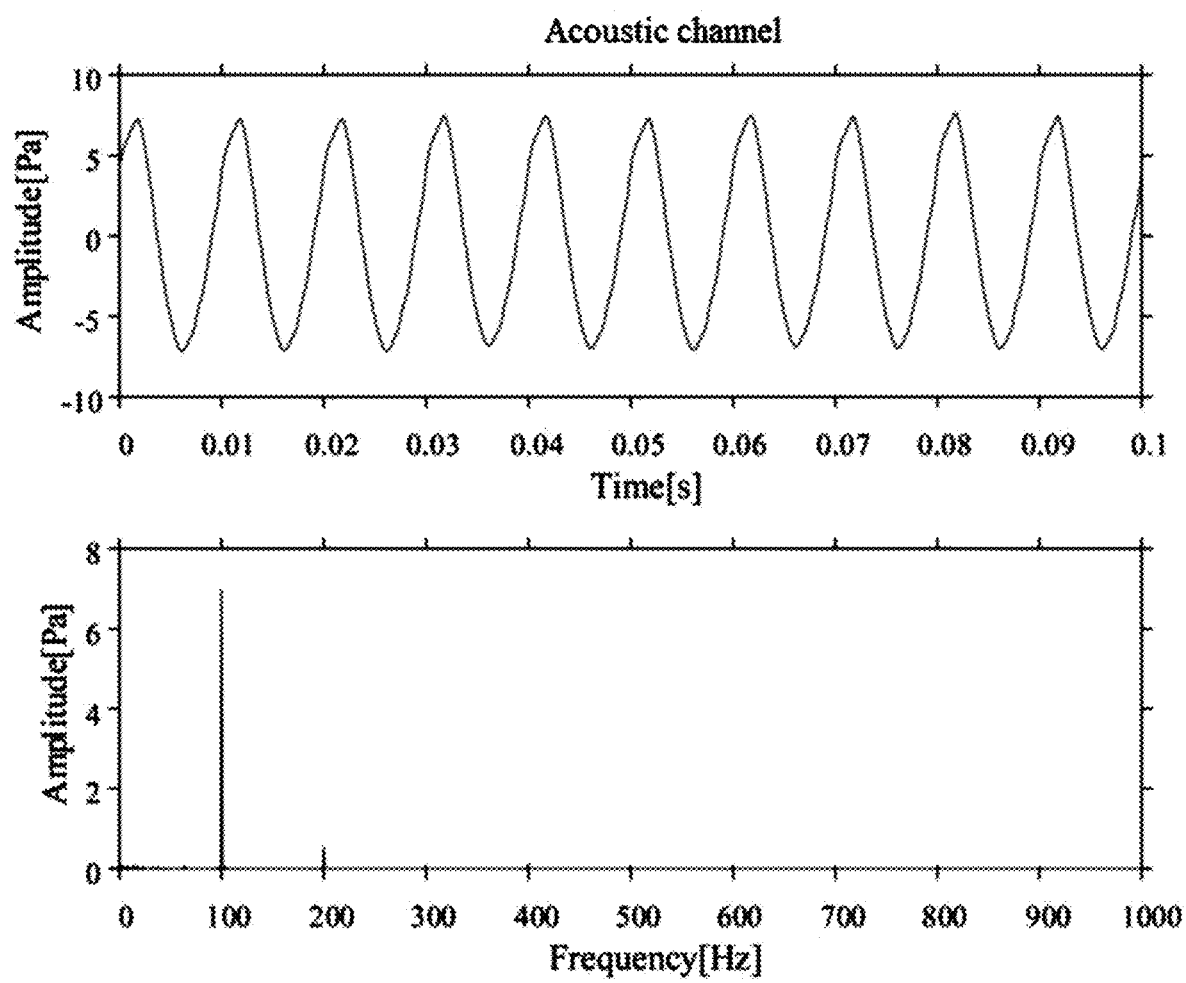
FIG. 7 is a screenshot of the acoustic signal of the fourth channel in the present disclosure.

Connect the first vibration sensor to a first channel of a capture card through a cable, connect the second vibration sensor to a second channel of the capture card through a cable, connect the third vibration sensor to a third channel of the capture card through a cable, connect the microphone to a fourth channel of the capture card through a cable, and connect the capture card to a computer through a data cable. Taking a time period in the signal collect process as an example, FIG. 4 shows a screenshot of the vibration signal of the first channel, FIG. 5 shows a screenshot of the vibration signal of the second channel, FIG. 6 shows a screenshot of the vibration signal of the third channel and FIG. 7 shows a screenshot of the acoustic signal of the fourth channel.

S103: collection period.

Take 30 minutes as a collection period to collect the vibration signals of three measuring points and the noise signals of one measuring point.

S104: extract characteristics from the signals.

Perform Fast Fourier transform on the signals collected through the four channels to extract the fundamental frequency amplitudes. Each set of fundamental frequency amplitudes forms a characteristic sequence, and four sets of fundamental frequency amplitudes form a total of four characteristic sequences. The sequence form of each channel is: $f(s) = \{f_1, f_2, \ldots f_s\}$.

S105: filter the characteristic sequence.

Filter the time series of the four channels, and use the filtered result as an input of the LSTM neural network. The combined filter is defined as follows:

$$y(s) = \frac{[OC(f(s)) + CO(f(s))]}{2} \quad (1)$$

In Formula (1), f(s) is a fundamental frequency characteristic sequence before filtering for each channel, in the form of a vector, and each characteristic sequence is directly obtained through signal collection and fast Fourier transform; y(s) is obtained by filtering the original characteristic sequence with the above-mentioned formula, in the form of a vector; OC is an open-closed morphological filtering form, and CO is a closed-open morphological filtering form.

S2: establish an LSTM neural network model and set parameters.

S201: determine the number of neurons of an input layer, a hidden layer and an output layer.

It is determined that the number of neurons of the input layer is 480, the output layer is 48, and the hidden layer is 24 in the neural network.

S202: construct a prediction model.

Construct a neural network model in the form of multi-step training on the data. The steps have time-series relationship. The specific characteristic is that in each iteration, the output with current information is used as a portion of the input for the next time step.

S3: use an LSTM neural network to predict signal fundamental frequency amplitudes.

S301: input sequences.

Take the sequences filtered in step S105 as input.

S302: determine a learning rate, the number of iterations and an error standard.

Determine that the neural network learning rate is 0.001, the number of iterations is 5000, and the error standard is 0.00001.

S303: determine a current time forget gate.

In the prediction process, the forget gate in the time series prediction model determines information to be forgotten and information to be retained after receiving information transmitted from the previous cell state $C_{t-1}$, and its output is as follows:

$$f_t = \sigma(W_f x_t + U_f h_{t-1} + b_f) \quad (2)$$

In Formula (2), f is the forget gate for filtering the information that needs to be retained and the information that needs to be forgotten in the previous time information, in the form of numerical value; $x_t$ is the current time input in the characteristic sequence, in the form of numerical value; $h_{t-1}$ is previous time output result, in the form of numerical value; $W_f$ is weight value of the current time input $x_t$, in the form of numerical value; $U_f$ is the weight value of the previous time output $h_{t-1}$, in the form of numerical value; $b_f$ is the offset for calculating the forget gate, in the form of numerical value; σ is the sigmoid activation function for mapping the variables to between 0 and 1, and the formula is:

$$\sigma(j) = \frac{1}{1+e^{-j}} \quad (3)$$

In Formula (3), j is the independent variable of the sigmoid activation function, in the form of numerical value; σ(j) is the mapping result of the independent variable j, and its range is between 0 and 1, in the form of numerical value.

S304: determine the current time input gate.

The input gate in the time series prediction model determines the information to be input after receiving the information of the current time input $x_t$ and the previous time output $h_{t-1}$, namely, $$i_t = \sigma(W_i x_t + U_i h_{t-1} + b_i) \quad (4)$$

In Formula (4), $i_t$ is the input gate for filtering information that needs to be retained and information that needs to be deleted in the current time information, in the form of numerical value; $W_i$ is the weight value of the current time input $x_t$, in the form of numerical value; $U_i$ is the weight value of the previous time output $h_{t-1}$, in the form of numerical value; $b_i$ is the offset for calculating the input gate, in the form of numerical value; σ is the sigmoid activation function for mapping the variables to between 0 and 1.

S305: determine current candidate information.

$$\tilde{C}_t = \tanh(w_c x_t + U_c h_{t-1} + b_c) \quad (5)$$

In Formula (5), $\tilde{C}_t$ denotes the current time candidate information, in the form of numerical value; $\overline{C}_t$ contains information of the current time input $x_t$ and the previous time output $h_{t-1}$; $W_c$ is the weight value of the current time input $x_t$; $U_c$ is the weight value of the previous time output $h_{t-1}$; $b_c$ is the offset for calculating of the current candidate information, in the form of numerical value; tanh is the activation function, the calculation result is between −1 and 1, and the formula is:

$$\tanh(k) = \frac{e^k - e^{-k}}{e^k + e^{-k}} \quad (6)$$

In Formula (6), k is the independent variable of the tanh activation function; tanh(k) is the result of the independent variable k after mapping, and its range is between −1 and 1.

S306: Determine the information to be retained in the current time candidate information.

The input gate $i_t$ and the candidate information $\tilde{C}_t$ are multiplied to obtain the retained information and store the information in the cell state Ct of the input gate.

S307: Determine the current time cell state.

Update the current time storage cell state, which combines the information of the candidate cell state $\tilde{C}_t$ with the information of the previous time state $C_{t-1}$; the current time storage cell state:

$$C_t = f_t * C_{t-1} + i_t * \tilde{C}_t \quad (7)$$

In Formula (7), $C_t$ is the current time storage cell state, in the form of numerical value; $f_t$ is the forget gate, in the form of numerical value; $C_{t-1}$ is the previous time storage cell state, in the form of numerical value; $i_t$ is the input gate, in the form of numerical value; $\tilde{C}_t$ is the current time candidate state, in the form of numerical value.

S308: determine the current time output gate.

The output gate in the time series prediction model determines the information to be output after receiving the information of the current time input $x_t$ and the previous time output $h_{t-1}$, that is, the output gate:

$$o_t = \sigma(W_o x_t + U_o h_{t-1} + b_o) \quad (8)$$

In Formula (8), $o_t$ is the output gate for filtering the information that needs to be output from the current time information, in the form of numerical value; $W_o$ is the weight value of the current time input $x_t$; $U_o$ is the weight value of the previous time output $h_{t-1}$; $b_o$ is the offset for calculating the output gate, in the form of numerical value; σ is the sigmoid activation function for mapping the variables to between 0 and 1.

The current time output is:

$$h_t = o_t * \tanh(C_t) \qquad (9)$$

In Formula (9), $h_t$ is the current time output, in the form of numerical value; $C_t$ is the current time storage cell state, in the form of numerical value; $o_t$ is the output gate, in the form of numerical value; tanh is the activation function for mapping the variables to between 0 and 1.

Step 309: predict the characteristic sequence.

Before the network reaches the preset number of iterations, if the error between $h_t$ in S308 and the true value is not less than the error threshold, update the network weight value and repeat steps S301-S308; before the network reaches the preset number of iterations, if the error between $h_t$ in S308 and the true value is less than the error threshold, or the network reaches the preset number of iterations, a predicated characteristic is calculated by the neural network, and the calculation formula is as follows:

$$F = \{f_1, f_2, \ldots f_i\} \qquad (10)$$

In Formula (10), F is the predicated characteristic sequence calculated by the prediction model, in the form of a one-dimensional sequence; i is the time corresponding to the sequence, in the form of numerical value, and the time i increases every 30 minutes according to the collection period of the collected signal; $f_i$ is the characteristic of the $i^{-th}$ time in the sequence F, in the form of numerical value.

S4: use the comprehensive deviation factor to evaluate the operating state of the high-voltage shunt reactor.

S401: calculate the comprehensive deviation factor.

$$M = \{m_1, m_2, \ldots m_i\} \qquad (11)$$

In Formula (11), M is the true characteristic sequence in the time period to be studied, in the form of a one-dimensional sequence; i is the time corresponding to the sequence, in the form of numerical value, and the time i increases every 30 minutes according to the collection period of the collected signal; $m_i$ is the characteristic of the $i^{-th}$ time in the sequence M, in the form of numerical value. Each value in the sequence M is obtained by the filtering in step S105.

Figure 8:
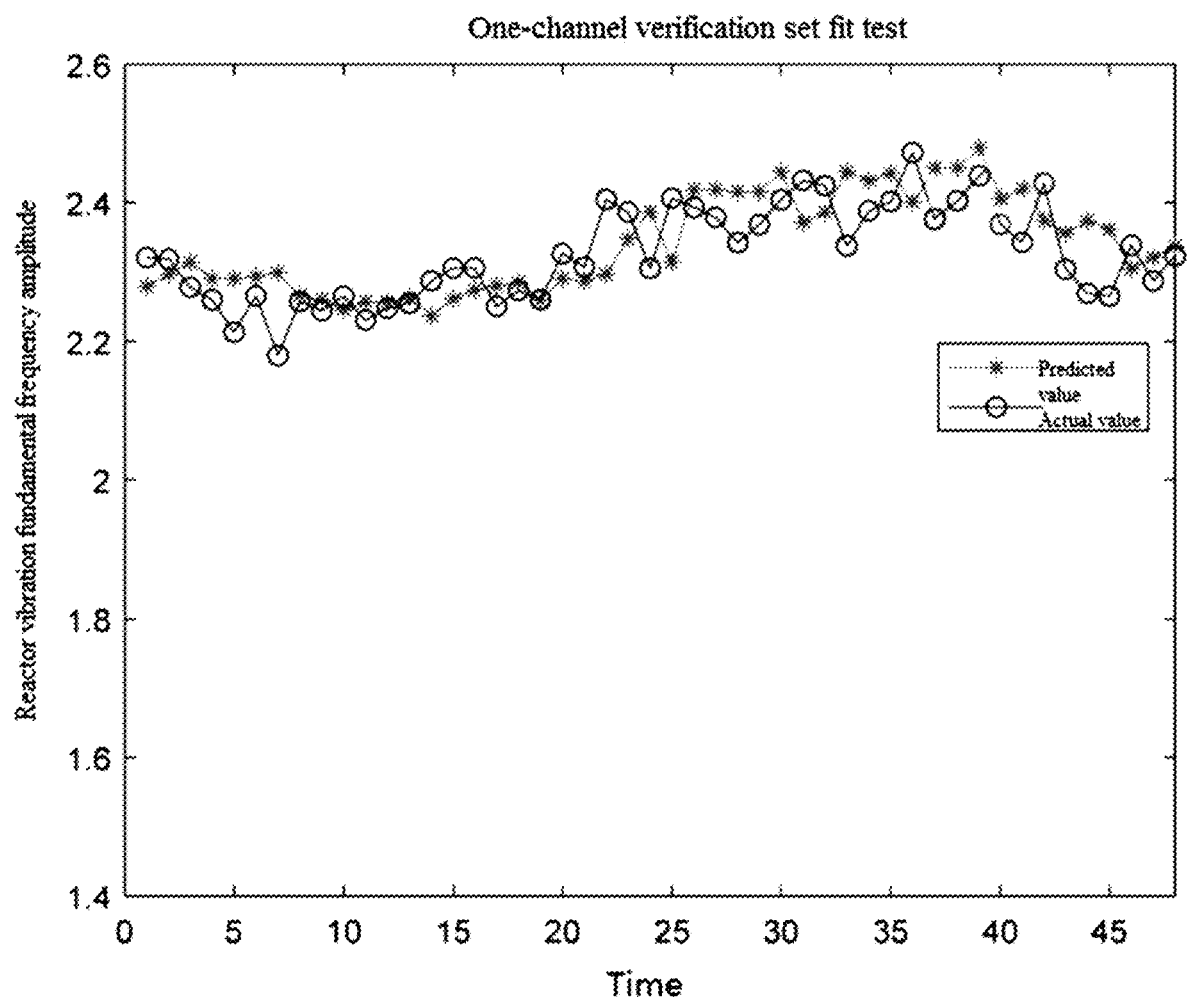
FIG. 8 is a screenshot of the comparison between the predicted characteristic sequence of the first channel and the real characteristic sequence in the present disclosure.
Figure 9:
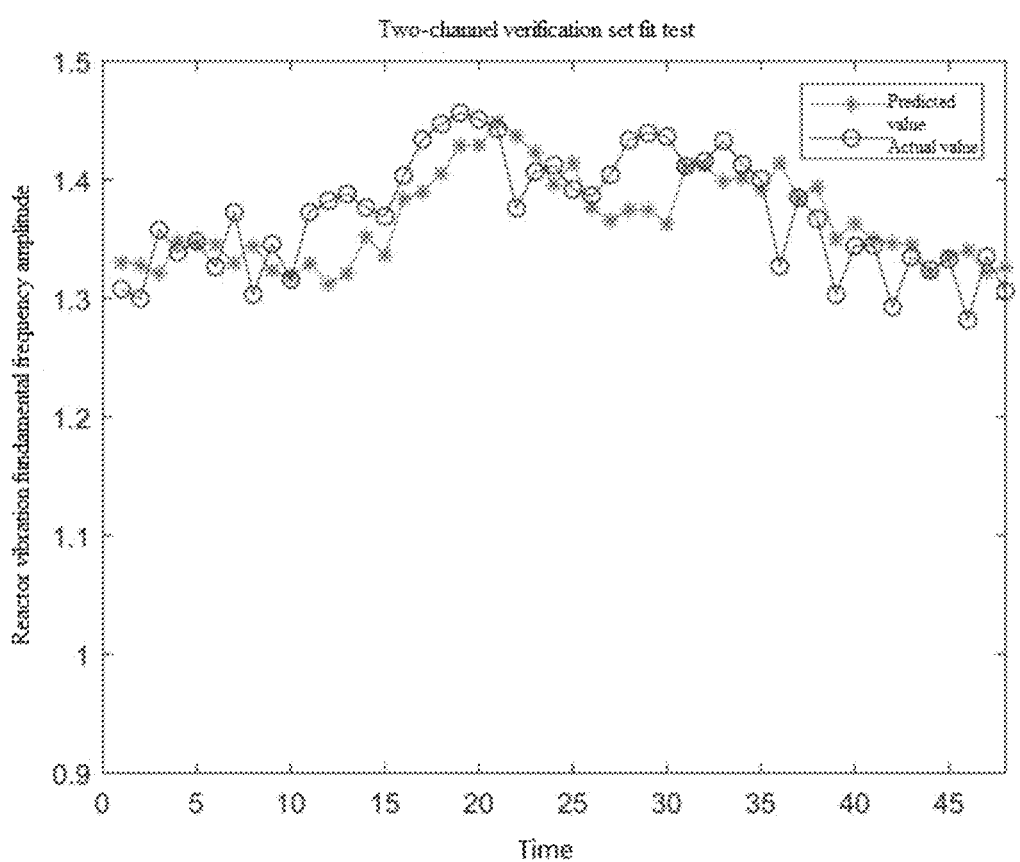
FIG. 9 is a screenshot of the comparison between the predicted characteristic sequence of the second channel and the real characteristic sequence in the present disclosure.
Figure 10:
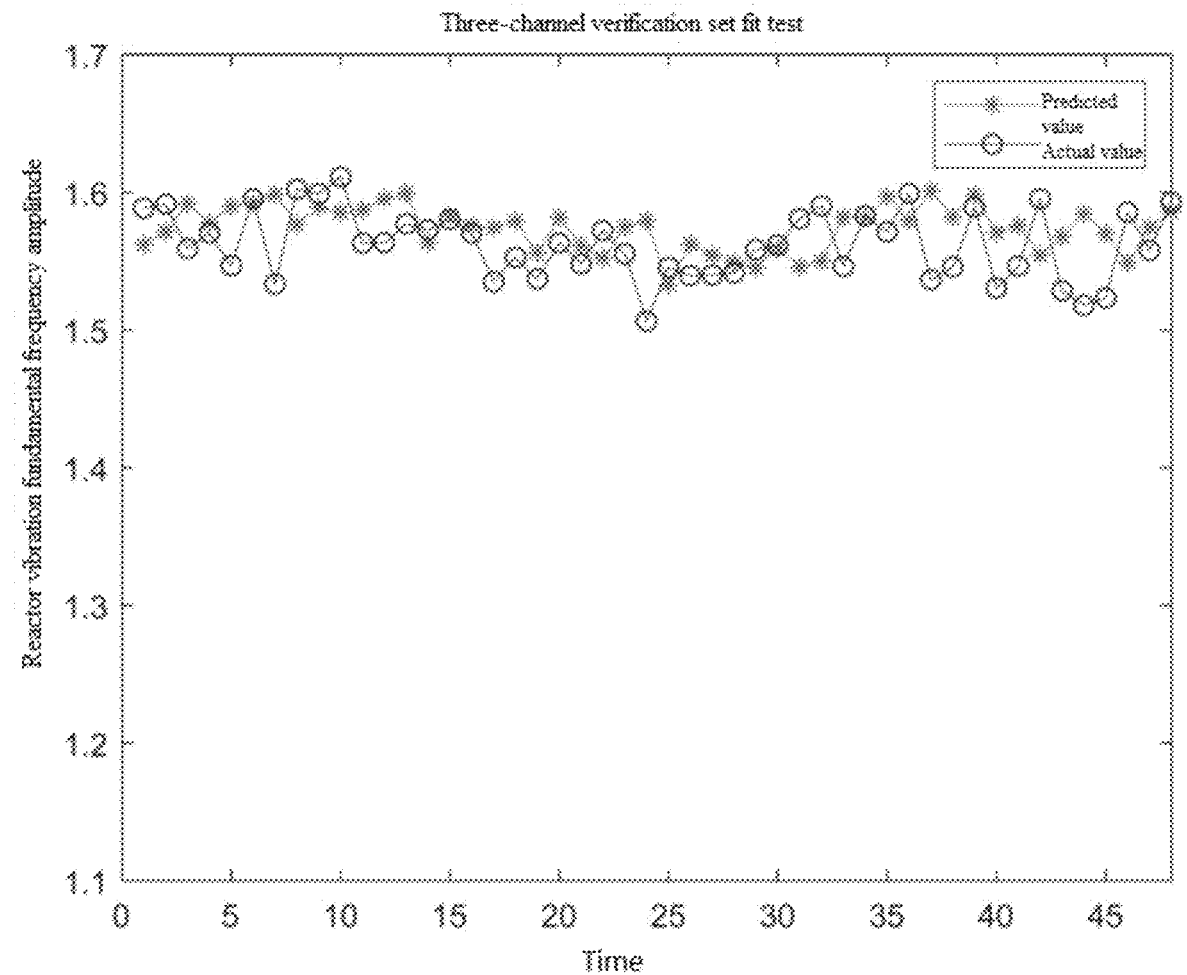
FIG. 10 is a screenshot of the comparison between the predicted characteristic sequence of the third channel and the real characteristic sequence in the present disclosure.
Figure 11:
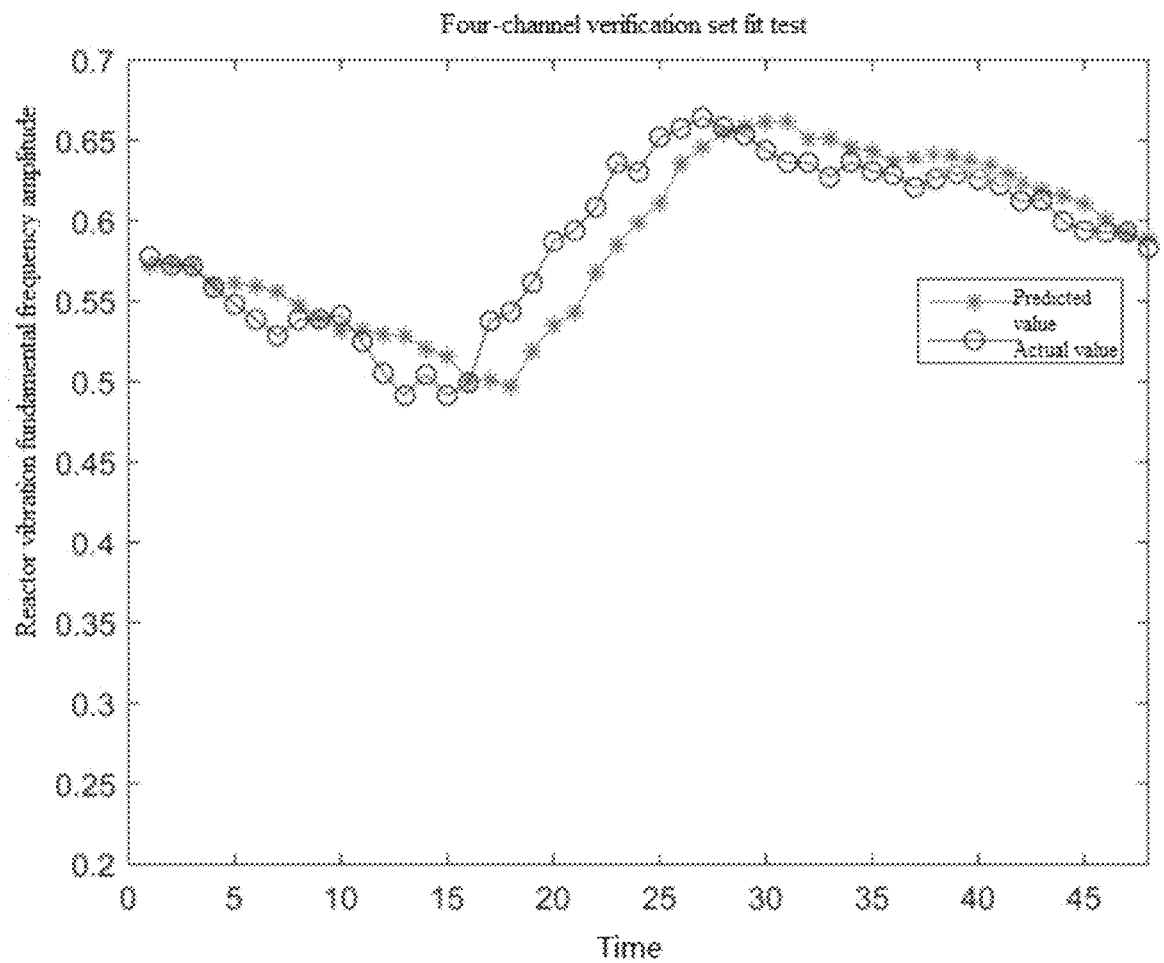
FIG. 11 is a screenshot of the comparison between the predicted characteristic sequence of the fourth channel and the real characteristic sequence in the present disclosure.

Compare the predicted sequence $F_i = \{f_1, f_2, \ldots f_i\}$ with the actual sequence to be studied $M_i = \{m_1, m_2, \ldots m_i\}$, and calculate the comprehensive deviation factor h. Taking a time period in the signal collect process as an example, FIG. 8 shows a screenshot of the comparison between the predicted characteristic sequence of the first channel and the real characteristic sequence, FIG. 9 shows a screenshot of the comparison between the predicted characteristic sequence of the second channel and the real characteristic sequence, FIG. 10 shows a screenshot of the comparison between the predicted characteristic sequence of the third channel and the real characteristic sequence, and FIG. 11 shows a screenshot of the comparison between the predicted characteristic sequence of the fourth channel and the real characteristic sequence.

The comprehensive deviation factor is defined as follows:

$$h = \sum_{i=1}^{p} \left| \frac{f_i - m_i}{p m_i} \right| \qquad (12)$$

In Formula (12), h is the comprehensive deviation factor calculated from the predicted sequence $\{f_1, f_2, \ldots f_i\}$ and the real sequence $\{m_1, m_2, \ldots m_i\}$, in the form of numerical value; i is the subscript of the two sequences, in the form of numerical value, which are the same as those in Formula (10) and Formula (11); p is the sequence length, in the form of numerical value.

S402: Determine whether the comprehensive deviation factor is greater than the threshold.

If h is greater than the upper limit $h_{max}$ of the comprehensive deviation factor, it indicates that the characteristics of the vibration signal deviate greatly from the ideal value. The internal fastening components of the high-voltage shunt reactor have a certain defect and an alarm is issued. The recommended value range for $h_{max}$ is [0.05, 0.15].

S403: alarm or repeat the above steps.

If the comprehensive deviation factor h is less than the upper limit $h_{max}$ of the comprehensive deviation factor, continue to collect data, and perform the step S1 based on the current data.

The first to third vibration sensors are all piezoelectric vibration sensors, the capture card is a four-channel capture card, and the piezoelectric vibration sensor, microphone, four-channel capture card and the computer itself and the corresponding communication connection technology are existing technologies which will not be repeated here.

Inventive Concept of the Application

The method proposed in this solution is mainly used to realize the operation state evaluation of high-voltage shunt reactor.

1. The current commonly state evaluation methods for high-voltage shunt reactors include oil chromatography, ultra-high frequency method, and ultrasonic method. These methods show high accuracy in the diagnosis of the late stage (insulation defects occur) of the high-voltage shunt reactor failure, but is difficult to diagnose in time for its early mechanical failures. The vibration method uses the vibration signal on the oil tank surface of the high-voltage shunt reactor to detect its mechanical state, and has the advantages of online, non-intrusive and sensitive to early mechanical failures. In order to conduct comprehensive and continuous failure monitoring, it is necessary to use an online monitoring system for the high-voltage shunt reactor for continuous vibration and noise collection on the surface of the oil tank.

2. The vibration method realizes the real-time observation and recording of the vibration signal on the oil tank surface of the high-voltage shunt reactor. Even for the same type of high-voltage shunt reactors produced by the same manufacturer, due to the production process control and the complexity of the mechanical system of the high-voltage shunt reactor itself, the vibration signals will also be different; and for a particular high-voltage shunt reactor, at different stages of its operation, the vibration signals will also change with the increase of operating years and fluctuations of environmental factors. The current diagnostic evaluation methods do not fully consider the operating characteristics of the observed high-voltage shunt reactor in different time dimensions, the selection of its typical healthy vibration signal set and typical fault vibration signal set and the establishment of criteria are often based on statistics from a small laboratory model experiment and experience results or other statistical results related to the reactors in operation, bringing certain difficulties to the evaluation of the state of the high-voltage shunt reactors. For the evaluation of the mechanical state of the high-voltage shunt reactor based on the vibration signal, it is of great significance to invent a method for evaluating the vibration characteristics of high-voltage shunt reactors, which comprehensively utilizes the equipment body to obtain the characteristic data that changes with time, and its criteria is personalized and adaptive to the current operating environment and operating life.

The online monitoring system selected in the application can comprehensively monitor the internal mechanical state and form a complete time series of data. Meanwhile, in order to predict the characteristic value of vibration and noise signals, evaluation of the vibration characteristics of the high-voltage shunt reactor based on LSTM neural network is proposed. No technical solution close to this solution has been found so far.

Purpose of the Application

The technical solution of the present application is suitable for performing sequence prediction fault diagnosis of characteristic value on the premise of having a complete time series data set of the high-voltage shunt reactor.

Technical Contribution of the Application

In the actual operation of a high-voltage shunt reactor, the iron core and windings vibrate due to stress. The internal mechanical state of the reactor is closely related to the characteristics of the vibration and noise signals. Therefore, predicting the characteristic value of the vibration and noise signals in advance can effectively pay attention to the operation state of the reactor and take timely measures.

In order to solve the above technical problems, the technical solution adopted by the present disclosure is to continuously collect vibration signals and noise signals on the surface of the oil tank of the high-voltage shunt reactor according to a fixed collection period, extract the characteristic value in the signals and form a time series; combine the time series prediction model, calculate a comprehensive deviation factor between the predicted value and the actual value, and determine according to the value of the factor whether an unnatural trend mechanical defect or failure occurs inside the oil tank of the reactor, thereby forming an evaluation method for the operating state of the high-voltage shunt reactor.

S1: collect vibration signals and noise signals of a high-voltage shunt reactor and perform data preprocessing.

S101: arrange measuring points.

As illustrated in FIG. 2, fix a first vibration sensor of a first channel on a front center position of the high-voltage shunt reactor box, with a height of 1.9 m; fix a second vibration sensor of a second channel on a side center position of the high-voltage shunt reactor box, with a height of 1.9 m; fix a third vibration sensor of a third channel on a back center position of the high-voltage shunt reactor box, with a height of 1.9 m; and fix a microphone of a fourth channel in front of the front center position of the high-voltage shunt reactor box at a distance of 1 m from the front surface of the high-voltage shunt reactor box with a height of 1.6 m.

S102: collecting equipment.

The first to third vibration sensors are piezoelectric vibration sensors. The capture card is a four-channel capture card. The first vibration sensor is connected to the first channel of the capture card through a cable, the second vibration sensor is connected to the second channel of the capture card through a cable, the third vibration sensor is connected to the third channel of the capture card through a cable, the microphone is connected to the fourth channel of the capture card through a cable, the capture card is connected to the computer through a data cable, and the data collected by the capture card is viewed through a computer. The computer is the PC terminal, which is a laptop or desktop computer. Taking a time period in the signal collect process as an example, FIG. 4 shows a screenshot of the vibration signal of the first channel, FIG. 5 shows a screenshot of the vibration signal of the second channel, FIG. 6 shows a screenshot of the vibration signal of the third channel and FIG. 7 shows a screenshot of the acoustic signal of the fourth channel.

S103: collection period.

Take 30 minutes as a collection period to continuously and synchronously collect the vibration signals and the noise signals of the four measuring points all day long.

S104: extract characteristics from the signals.

Perform Fast Fourier transform on the signals collected through the four channels to extract the fundamental frequency amplitudes. Four sets of fundamental frequency amplitudes form a total of four characteristic sequences. The sequence form of each channel is: $f(s)=\{f_1, f_2, \ldots f_s\}$.

S105: filter the characteristic sequence.

Filter the time series of the four channels, and use the filtered result as an input of the LSTM neural network. The combined filter is defined as follows:

$$y(s) = \frac{[OC(f(s)) + CO(f(s))]}{2} \quad (1)$$

In Formula (1), f(s) is a fundamental frequency characteristic sequence before filtering for each channel, without unit but just representing a vector, and each characteristic sequence is directly obtained through signal collection and fast Fourier transform; y(s) is obtained by filtering the original characteristic sequence with the above-mentioned formula, without unit but just representing a vector; OC is an open-closed morphological filtering form, and CO is a closed-open morphological filtering form.

S2: establish an LSTM neural network model and set parameters.

S201: determine the number of neurons of an input layer, a hidden layer and an output layer.

It is determined that the number of neurons of the input layer is 480, the output layer is 48, and the hidden layer is 24 in the neural network.

S202: construct a prediction model.

As illustrated in FIG. 3, the neural network model is constructed in the form of multi-step training on the data. The steps have time-series relationship. The specific characteristic is that in each iteration, the output with current information is used as a portion of the input for the next time step. The hidden layer contains forget gates, input gates and output gates. That is, for the previous time information, a portion is selectively deleted; for the current time input, a portion is selectively left; the current time output result is the portion retained in the information of the previous time output and the current time input.

S3: use an LSTM neural network to predict signal fundamental frequency amplitudes.

S301: input sequences.

Take one of these channels for example, and take the sequences filtered in step S105 as input.

S302: determine a learning rate, the number of iterations and an error standard.

Determine that the neural network learning rate is 0.001, the number of iterations is 5000, and the error standard is 0.00001.

S303: determine a current time forget gate.

In the prediction process, the forget gate in the time series prediction model determines information to be forgotten and information to be retained after receiving information transmitted from the previous cell state $C_{t-1}$, and its output:

$$f_t = \sigma(W_f x_t + U_f h_{t-1} + b_f) \quad (2)$$

In Formula (2), f is the forget gate for filtering the information that needs to be retained and the information that needs to be forgotten in the previous time information, without unit and in the form of numerical value; $x_t$ is the current time input in the characteristic sequence, without unit and in the form of numerical value; $b_{t-1}$ is previous time output result, without unit and in the form of numerical value; $W_f$ is weight value of the current time input $x_t$, without unit and in the form of numerical value; $U_f$ is the weight value of the previous time output $h_{t-1}$, without unit and in the form of numerical value; $b_f$ is the offset for calculating the forget gate, without unit and in the form of numerical value; $\sigma$ is the sigmoid activation function for mapping the variables to between 0 and 1, and the formula is:

$$\sigma(j) = \frac{1}{1 + e^{-j}} \quad (3)$$

In Formula (3), j is the independent variable of the sigmoid activation function, without unit and in the form of numerical value; $\sigma(j)$ is the mapping result of the independent variable j, and its range is between 0 and 1, without unit and in the form of numerical value. Formula (3) specifically explains the calculation method of the sigmoid function in Formula (2).

S304: determine the current time input gate.

The input gate in the time series prediction model determines the information to be input after receiving the information of the current time input $x_t$ and the previous time output $h_{t-1}$, namely.

$$i_t = \sigma(W_i x_t + U_i h_{t-1} + b_i) \quad (4)$$

In Formula (4), $i_t$ is the input gate for filtering information that needs to be retained and information that needs to be deleted in the current time information, without unit and in the form of numerical value; $W_i$ is the weight value of the current time input $x_t$, without unit and in the form of numerical value; $U_i$ is the weight value of the previous time output $h_{t-1}$, without unit and in the form of numerical value; $b_i$ is the offset for calculating the input gate, without unit and in the form of numerical value; $\sigma$ is the sigmoid activation function for mapping the variables to between 0 and 1, with explanations similar to the above.

S305: determine current candidate information.

$$\tilde{C}_t = \tanh(W_c x_t + U_c h_{t-1} + b_c) \quad (5)$$

In Formula (5), $\tilde{C}_t$ denotes the current time candidate information value $h_{t-1}$, without unit and in the form of numerical value; $\tilde{C}_t$ contains information of the current time input $x_t$ and the previous time output $h_{t-1}$; $W_c$ is the weight value of the current time input $x_t$, without unit and in the form of numerical value; $U_c$ is the weight value of the previous time output $h_{t-1}$, without unit and in the form of numerical value; $b_c$ is the offset for calculating of the current candidate information, without unit and in the form of numerical value; tanh is the activation function, the calculation result is between -1 and 1, and the formula is:

$$\tanh(k) = \frac{e^k - e^{-k}}{e^k + e^{-k}} \quad (6)$$

In Formula (6), k is the independent variable of the tanh activation function, without unit and in the form of numerical value; tanh(k) is the result of the independent variable k after mapping, and its range is between -1 and 1, without unit and in the form of numerical value. Formula (6) specifically explains the calculation method of the tanh function in Formula (5). Both the sigmoid function and the tanh function can be used as activation functions, but the two forms are different and the ranges of results obtained are different.

S306: Determine the information to be retained in the current time candidate information.

The input gate $i_t$ and candidate information $\tilde{C}_t$ jointly determine the selected information and store it in the cell state Ct of the input gate. The input gate $i_t$ is equivalent to a threshold, as a screening criterion, and the candidate information $\tilde{C}_t$ is the information that may be selected or eliminated. The two are multiplied to obtain the retained information.

S307: Determine the current time cell state.

Update the current time storage cell state, which combines the information of the candidate cell state $\tilde{C}_t$ with the information of the previous time state $C_{t-1}$; the current time storage cell state:

$$C_t = f_t * C_{t-1} + i_t * \tilde{C}_t \quad (7)$$

In Formula (7), $C_t$ is the current time storage cell state, without unit and in the form of numerical value; $f_t$ is the forget gate, without unit and in the form of numerical value, and is the calculated results of Formula (2); $C_{t-1}$ is the previous time storage cell state, without unit and in the form of numerical value, and the storage cell state at the initial time is only related to the initial time input $x_1$, i.e., $C_1 = \tanh(W_i x_i)$, where $i_t$ is the input gate, without unit and in the form of numerical value; $\overline{C}_t$ is the current time candidate state, without unit and in the form of numerical value. The forget gate $f_t$ calculated by Formula (2) determines the information that needs to be retained in the previous time state $C_{t-1}$, and the input gate $i_t$ calculated by Formula (4) determines the information that needs to be retained in the current time candidate state $\tilde{C}_t$.

S308: determine the current time output gate.

The output gate in the time series prediction model determines the information to be output after receiving the information of the current time input $x_t$ and the previous time output $h_{t-1}$, that is, the output gate:

$$o_t = \sigma(W_o x_t + U_o h_{t-1} + b_o) \quad (8)$$

In Formula (8), $o_t$ is the output gate for filtering the information that needs to be output from the current time information, without unit and in the form of numerical value; $W_o$ is the weight value of the current time input $x_t$, without unit and in the form of numerical value; $U_o$ is the weight value of the previous time output $h_{t-1}$, without unit and in the form of numerical value; $b_o$ is the offset for calculating the output gate, without unit and in the form of numerical value; $\sigma$ is the sigmoid activation function for mapping the variables to between 0 and 1, with explanations similar to the above.

The current time output is:

$$h_t = o_t * \tanh(C_t) \quad (9)$$

In Formula (9), $h_t$ is the current time output, without unit and in the form of numerical value; $C_t$ is the current time storage cell state, without unit and in the form of numerical value; $o_t$ is the output gate, i.e., the calculated results of Formula (8), without unit and in the form of numerical value; tanh is the activation function for mapping the variables to between 0 and 1, with explanations similar to the above. The output gate $o_t$ determines the portion of the current information that can be output.

The aspects that need to be explained in the description of the above process: the calculation process of the prediction model is based on the previous time information to calculate the current time information, and then uses the current time information to calculate the future time information, so as to realize the feature sequence prediction.

S309: predict the characteristic sequence.

Before the network reaches the preset number of iterations, if the error between $h_t$ in S308 and the true value is not less than the error threshold, update the network weight value and repeat steps S301-S308; before the network reaches the preset number of iterations, if the error between $h_t$ in S308 and the true value is less than the error threshold, or the network reaches the preset number of iterations, a predicted characteristic sequence is calculated by the neural network:

$$F=\{f_1, f_2, \ldots f_i\} \quad (10)$$

In Formula (10), F is a predicted characteristic sequence calculated by the prediction model, with no units and in the form of a one-dimensional sequence; i is the time corresponding to the sequence, without unit and in the form of numerical value, and the time i increases every 30 minutes according to the collection period of the collected signal; $f_i$ is the characteristic of the $i^{-th}$ time in the sequence F, without unit and in the form of numerical value. Each value in the characteristic sequence is calculated by Formula (9).

S4: use the comprehensive deviation factor to evaluate the operating state of the high-voltage shunt reactor.

S401: calculate the comprehensive deviation factor.

$$M=\{m_1, m_2, \ldots m_i\} \quad (11)$$

In Formula (11), M is the true characteristic sequence in the time period to be studied-without unit and in the form of a one-dimensional sequence; i is the time corresponding to the sequence, without unit and in the form of numerical value, and the time i increases every 30 minutes according to the collection period of the collected signal; is the characteristic of the $i^{-th}$ time in the sequence M, without unit and in the form of numerical value. The i in Formula (11) has the same meaning to that in Formula (10), representing time synchronization. Each value in the sequence M is obtained by the filtering in step S105.

Compare the predicted sequence $F_i=\{f_1, f_2, \ldots f_i\}$ with the actual sequence to be studied $M_i=\{m_1, m_2, \ldots m_i\}$, and calculate the comprehensive deviation factor h. Taking a time period in the signal collect process as an example, FIG. 8 shows a screenshot of the comparison between the predicted characteristic sequence of the first channel and the real characteristic sequence, FIG. 9 shows a screenshot of the comparison between the predicted characteristic sequence of the second channel and the real characteristic sequence, FIG. 10 shows a screenshot of the comparison between the predicted characteristic sequence of the third channel and the real characteristic sequence, and FIG. 11 shows a screenshot of the comparison between the predicted characteristic sequence of the fourth channel and the real characteristic sequence.

The comprehensive deviation factor is defined as follows:

$$h = \sum_{i=1}^{p} \left| \frac{f_i - m_i}{pm_i} \right| \quad (12)$$

In Formula (12), h is the comprehensive deviation factor calculated from the predicted sequence $\{f_1, f_2, \ldots f_i\}$ and the real sequence $\{m_1, m_2, \ldots m_i\}$, without unit and in the form of numerical value; i is the subscript of the two sequences, without unit and in the form of numerical value, which are the same as those in Formula (10) and Formula (11); p is the sequence length, without unit and in the form of numerical value; $f_i$ is the characteristic value at a certain time in the predicted sequence, without unit and in the form of numerical value, same to $f_i$ in Formula (10); is the characteristic value at a certain time in the actual sequence, without unit and in the form of numerical value, same to in Formula (11).

S402: Determine whether the comprehensive deviation factor is greater than the threshold.

If h is greater than the upper limit $h_{max}$ of the comprehensive deviation factor, it indicates that the characteristics of the vibration signal deviate greatly from the ideal value, and the internal fastening components of the high-voltage shunt reactor have a certain defect and an alarm is issued. The recommended value range for $h_{max}$ is [0.05, 0.15].

S403: alarm or repeat the above steps.

If the comprehensive deviation factor h is less than the upper limit $h_{max}$ of the comprehensive deviation factor, continue to collect data, and perform the step S1 based on the current data.

The beneficial effects produced by using the above technical solutions are as follows.

The vibration method is used to collect the vibration signals on the surface of the oil tank of the high-voltage shunt reactor, which has the advantages of online, non-invasive and sensitive to early mechanical failures. Based on the historical data and real-time measurement data of the four channels of the high-voltage shunt reactor under normal states, and by extracting the fundamental frequency amplitude of the vibration signal, it can sensitively reflect the internal mechanical state of the oil tank.

Combined with the LSTM neural network time series prediction model, it can accurately predict the natural change trend of the vibration characteristics of the reactor for a period of time in the future. By comparing the prediction results with the actual data, it is found that the prediction results have a relatively high accuracy, can show the internal mechanical state in a period of time in the future, and have practical reference significance.

By comparing the predicted results for a period of time in the future with the actual characteristic value, and calculating the comprehensive deviation factor, it is possible to determine whether there are mechanical defects inside the reactor by setting the threshold value, thereby forming an evaluation method for the operating state of the high-voltage shunt reactor.

Sub-item description of technical solutions is as follows.

This method integrates the vibration sensor and the microphone on the same collection system, and synchronously collects the vibration signal and the noise signal. In order to obtain complete data, the system collects vibration and noise on the surface of the oil tank every 30 minutes.

In order to accurately evaluate the operating state of the reactor, the vibration and noise signal is processed by fast Fourier transform from the time domain signal to the frequency domain signal. The fundamental frequency characteristics that can reflect the internal mechanical state are extracted from the signal and the LSTM neural network prediction model is used.

The fluctuation of the vibration signal and noise signal characteristic value on the surface of the fuel tank is closely related to the change of the internal mechanical state. This method builds an LSTM network model to predict the characteristic value of vibration and noise in the normal state within one day in the future. In case of larger mechanical defects occur in the internal of the oil tank, the actual vibration characteristics of the surface of the fuel tank will inevitably undergo abrupt changes, resulting in a huge deviation from the predicted results. By calculating the comprehensive deviation factor, the operating state of the reactor is evaluated by determining whether the measurement factor exceeds the threshold.

Advantages of the Application

The vibration and noise data of the normal operation of the on-site high-voltage shunt reactor is collected. There are vibration signals of three channels of and acoustic signal of one channel. The collection equipment runs around the clock. The data is collected every 30 minutes and stored in the cloud. Vibration monitoring is performed on the surface of the oil tank of the high-voltage shunt reactor. Three vibration acceleration measuring points are located at the centers of the front and back of the oil tank near the windings and the center of the side near the side yoke. The acoustic sensor is located at the center of the front of the tank. The vibration and noise online monitoring system is used to monitor the vibration signal and noise signals of a 1000 kV substation reactor in real time. The fundamental frequency amplitude of vibration that can sensitively reflect the internal mechanical state of the high-voltage shunt reactor is selected as the characteristic quantity, and the fundamental frequency amplitude of the signal of each channel is formed into a complete timing sequence to predict the fundamental frequency amplitude for a period of time in the future. Based on the LSTM neural network prediction model, the high-voltage shunt reactor vibration characteristic evaluation is proposed, which can clearly determine the mechanical state and characteristic trend by comparing the actual trend with the predicted trend.

After the method of the application has been operated confidentially for a period of time, the benefits of feedback from on-site technicians are as follows.

1. In the application, the vibration and noise signals of the high-voltage shunt reactor are collected through an online monitoring system, and the vibration fundamental frequency amplitude that can sensitively reflect the internal mechanical state of the high-voltage shunt reactor is collected as the characteristic quantity.

2. In the application, a complete time series of data is formed to predict the amplitude of the fundamental frequency of vibration; and the high-voltage shunt reactor vibration characteristic evaluation based on the LSTM neural network prediction model is proposed, which can clearly determine the mechanical state and characteristic trend by comparing the actual trend with the predicted trend.

The invention claimed is:

1. A method for evaluating mechanical state of a high-voltage shunt reactor based on vibration characteristics, comprising: based on historical state data and real-time vibration and noise signal data of the high-voltage shunt reactor and through an LSTM neural network time series prediction model, comparing deviation between predicted characteristic value and actual characteristic value, and determining whether the high-voltage shunt reactor has mechanical defects or failures;

wherein the method specifically comprises: collecting vibration signals and noise signals on a surface of an oil tank of the high-voltage shunt reactor, extracting characteristic values in the vibration signals and noise signals and form a time series, combining with the time series prediction model to calculate a comprehensive deviation factor between the predicted characteristic value and the actual characteristic value, and determining whether mechanical defects or failures with unnatural trends occur inside the oil tank of the high-voltage shunt reactor by the comprehensive deviation factor;

wherein the method comprises: step S1: collecting vibration signals and noise signals of the high-voltage shunt reactor and performing data preprocessing; S2: establishing an LSTM neural network model and setting parameters; S3: predicting signal fundamental frequency amplitudes by using an LSTM neural network; S4: evaluating operating state of the high-voltage shunt reactor by using the comprehensive deviation factor;

wherein specifically steps of step S2 comprise:

step S201: determining the number of neurons in an input layer, a hidden layer and an output layer; and step S202: constructing a prediction model;

in step S201: determining that the number of neurons of the input layer is 480, the output layer is 48, and the hidden layer is 24 in the neural network;

in step S202: constructing a neural network model in a form of multi-step training on the data, the steps have time-series relationship; in each iteration, using an output with current information as a portion of an input for a next time step;

wherein specifically steps of step S1 comprise: step S101: arranging measuring points; step S102: collecting equipment; step S103: collection period; step S104: extracting characteristics from the signals; and step S105: filtering a characteristic sequence;

wherein steps of step S4 comprise: step S401: calculating the comprehensive deviation factor; step S402: determining whether the comprehensive deviation factor is greater than a threshold, and step S403: alarming or repeating the above steps;

in step S401: the true characteristic sequence is defined as follows:

$$M=\{m_1, m_2, \ldots m_i\} \quad (11)$$

in Formula (11), M is a true characteristic sequence, in a form of a one-dimensional sequence; i is a value of the time corresponding to the sequence, and the time i increases every 30 minutes according to the collection period of the collected signal; $m_i$ is a value corresponding to the characteristic of the $i^{-th}$ time in the sequence M; each value in the sequence M is obtained by the filtering in step S105;

comparing a predicted sequence $F_i=\{f_1, f_2, \ldots f_i\}$ with an actual sequence to be studied $M_i=\{m_1, m_2, \ldots m_i\}$, and calculating the comprehensive deviation factor h; the comprehensive deviation factor is defined as follows:

$$h = \sum_{i=1}^{p} \left| \frac{f_i - m_i}{pm_i} \right| \quad (12)$$

in Formula (12), h is the comprehensive deviation factor calculated from the predicted sequence $\{f_1, f_2, \ldots f_i\}$ and a real sequence $\{m_1, m_2, \ldots m_i\}$, without unit and in the form of numerical value; i is subscript of the two sequences, without unit and in the form of numerical value, which are the same as those in Formula (10) and Formula (11); p is a sequence length, without unit and in the form of numerical value;

in step S402: if h is greater than an upper limit $h_{max}$ of the comprehensive deviation factor, it indicates that the characteristics of the vibration signal deviate greatly from an ideal value, and internal fastening components of the high-voltage shunt reactor have a certain defect and an alarm is issued; a recommended value range for $h_{max}$ is [0.05, 0.15];

in step S403: if the comprehensive deviation factor h is less than the upper limit $h_{max}$ of the comprehensive deviation factor, continuing to collect data, and performing the step S1 based on the current data.

2. The method for evaluating mechanical state of a high-voltage shunt reactor based on vibration characteristics according to claim 1, comprising: using fundamental frequency amplitudes of the vibration signals and the noise signals on the surface of the oil tank of the high-voltage shunt reactor as characteristic variables.

3. The method for evaluating mechanical state of a high-voltage shunt reactor based on vibration characteristics according to claim 1, comprising: taking 30 minutes as a sampling period to collect the vibration signals and the noise signals on the surface of the oil tank of the high-voltage shunt reactor.

4. The method for evaluating mechanical state of a high-voltage shunt reactor based on vibration characteristics according to claim 1, comprising: predicting vibration characteristic values of the high-voltage shunt reactor for a period of time in the future through the LSTM neural network.

5. The method for evaluating mechanical state of a high-voltage shunt reactor based on vibration characteristics according to claim 1, comprising: calculating, based on the predicted characteristic value obtained from the prediction of the vibration characteristics of through the LSTM neural network, a comprehensive deviation factor between the predicted characteristic value and the actual characteristic value, and using the comprehensive deviation factor as a state evaluation index.

6. The method for evaluating mechanical state of a high-voltage shunt reactor based on vibration characteristics according to claim 1, wherein specific steps of step S1 comprise: step S101: arranging measuring points; step S102: collecting equipment; step S103: collection period; step S104: extracting characteristics from the signals; and step S105: filtering a characteristic sequence;

specific steps of step S3 comprise: step S301: inputting sequence; step S302: determining a learning rate, the number of iterations and an error standard; step S303: determining a current time forget gate; step S304: determining a current time input gate; step S305: determining current time candidate information; step S306: determining information to be retained in the current time candidate information; step S307: determining a current time cell state; step S308: determining a current time output gate; and step S309: predicting a characteristic sequence;

in step S301: taking the sequences filtered in step S105 as input;

in step S302: determining that the neural network learning rate is 0.001, the number of iterations is 5000, and the error standard is 0.00001;

in step S303: in the prediction process, a forget gate in the time series prediction model determines information to be forgotten and information to be retained after receiving information transmitted from a previous cell state $C_{t-1}$, and its output is as follows:

$$f_t = \sigma(W_f x_t + U_f h_{t-1} + b_f) \quad (2)$$

in Formula (2), $f_t$ is the forget gate for filtering the information that needs to be retained and the information that needs to be forgotten in previous time information, without unit and in a form of numerical value; $x_t$ is current time input in the characteristic sequence, without unit and in the form of numerical value; $h_{t-1}$ is previous time output result, in the form of numerical value; $W_f$ is weight value of the current time input $x_t$, without unit and in the form of numerical value; $U_f$ is weight value of the previous time output $h_{t-1}$, in the form of numerical value; $b_f$ is offset for calculating the forget gate, without unit and in the form of numerical value; $\sigma$ is sigmoid activation function for mapping variables to between 0 and 1, and a formula is:

$$\sigma(j) = \frac{1}{1 + e^{-j}} \quad (3)$$

in Formula (3), j is an independent variable of the sigmoid activation function, in the form of numerical value; $\sigma(j)$ is mapping result of the independent variable j, and its range is between 0 and 1, in the form of numerical value;

in step S304: the input gate in the time series prediction model determines information to be input after receiving information of the current time input $x_t$ and the previous time output $h_{t-1}$, namely, $$i_t = \sigma(W_i x_t + U_i h_{t-1} + b_i) \quad (4)$$

in Formula (4), $i_t$ is input gate for filtering information that needs to be retained and information that needs to be deleted in the current time information, in the form of numerical value; $W_i$ is weight value of the current time input $x_t$, $U_i$ is weight value of the previous time output $h_{t-1}$; $b_i$ is offset for calculating the input gate, in the form of numerical value; $\sigma$ is sigmoid activation function for mapping the variables to between 0 and 1;

in step S305: current time candidate information satisfies the following formula:

$$\tilde{C}_t = \tanh(W_c x_t + U_c h_{t-1} + b_c) \quad (5)$$

in Formula (5), $\tilde{C}_t$ denotes the current time candidate information, without unit and in the form of numerical value; $\tilde{C}_t$ contains information of the current time input $x_t$ and the previous time output $h_{t-1}$; $W_c$ is weight value of the current time input $x_t$, without unit and in the form of numerical value; $U_c$ is weight value of the previous time output $h_{t-1}$; $b_c$ is offset for calculating the current candidate information, without unit and in the form of numerical value; tanh is activation function, the calculation result is between −1 and 1, and the formula is:

$$\tanh(k) = \frac{e^k - e^{-k}}{e^k + e^{-k}} \quad (6)$$

in Formula (6), k is an independent variable of the tanh activation function; tanh(k) is the mapping result of the independent variable k, and its range is between −1 and 1;

in step S306: the input gate $i_t$ and the candidate information $\tilde{C}_t$ are multiplied to obtain the retained information and store the information the cell state Ct of the input gate;

in step S307: updating current time storage cell state, which combines information of candidate cell state $\tilde{C}_t$ with information of previous time state $C_{t-1}$; the current time storage cell state satisfies the following formula:

$$C_t = f_t * C_{t-1} + i_t * \tilde{C}_t \qquad (7)$$

in Formula (7), $C_t$ is the current time storage cell state, without unit and in the form numerical value; $f_t$ is the forget gate, without unit and in the form numerical value; $C_{t-1}$ is the previous time storage cell state, without unit and in the form numerical value; $i_t$ is the input gate, without unit and in the form numerical value; $\tilde{C}_t$ is the current time candidate state, without unit and in the form numerical value;

in step S308: the output gate in the time series prediction model determines information to be output after receiving the information of the current time input $x_t$ and the previous time output $h_{t-1}$, that is, the output gate satisfies the following formula:

$$o_t = \sigma(W_o x_t + U_o h_{t-1} + b_o) \qquad (8)$$

in Formula (8), $o_t$ is the output gate for filtering the information that needs to be output from the current time information, without unit and in the form of numerical value; $W_o$ is weight value of the current time input $x_t$; $U_o$ is weight value of the previous time output $h_{t-1}$; $b_o$ is offset for calculating the output gate, without unit and in the form of numerical value; σ is sigmoid activation function for mapping the variables to between 0 and 1;

then the current time output is:

$$h_t = o_t * \tanh(C_t) \qquad (9)$$

in Formula (9), $h_t$ is the current time output, without unit and in the form numerical value; $C_t$ is current time storage cell state, without unit and in the form numerical value; $o_t$ is output gate, without unit and in the form numerical value; tanh is activation function for mapping the variables to between 0 and 1;

in step S309: before the network reaches a preset number of iterations, if an error between $h_t$ in S308 and the true value is not less than an error threshold, update a network weight value and repeat steps S301-S308; before the network reaches a preset number of iterations, if the error between $h_t$ in S308 and the true value is less than the error threshold, or the network reaches the preset number of iterations, a predicated characteristic sequence is calculated by the neural network, and the calculation formula is as follows:

$$F = \{f_1, f_2, \ldots f_i\} \qquad (10)$$

in Formula (10), F is a predicated characteristic sequence calculated by the prediction model, in the form of a one-dimensional sequence; i is a value of time corresponding to the sequence, and the time i increases every 30 minutes according to the collection period of the collected signal; and $f_i$ is a value corresponding to characteristic of the $i^{-th}$ time in the sequence F.

7. The method for evaluating mechanical state of a high-voltage shunt reactor based on vibration characteristics according to claim 1, wherein specific implementing steps of step S1 comprise: step S101: arranging measuring points; step S102: collecting equipment; step S103: collection period; step S104: extracting characteristics from the signals; and step S105: filtering a characteristic sequence;

in step S101: fixing a first vibration sensor of a first channel on a front face of a high-voltage shunt reactor box, fixing a second vibration sensor of a second channel on a side face of the high-voltage shunt reactor box, fixing a third vibration sensor of a third channel on a back of the high-voltage shunt reactor box, and fixing a microphone of a fourth channel in front of the front face of the high-voltage shunt reactor box to form four measuring points;

in step S102: connecting the first vibration sensor to a first channel of a capture card through a cable, connecting the second vibration sensor to a second channel of the capture card through a cable, connecting the third vibration sensor to a third channel of the capture card through a cable, connecting a microphone to a fourth channel of the capture card through a cable, and connecting the capture card to a computer through a data cable;

in step S103: taking 30 minutes as a collection period to collect the vibration signals of three measuring points and the noise signals of one measuring point;

in step S104: performing Fast Fourier transform on the signals collected through the four channels to extract the fundamental frequency amplitudes; each set of fundamental frequency amplitudes forms a characteristic sequence, and four sets of fundamental frequency amplitudes form a total of four characteristic sequences; the sequence form of each channel is: f(s)= $\{f_1, f_2, \ldots f_s\}$;

in step S105: filtering the time series of the four channels, and use the filtered result as an input of the LSTM neural network; the combined filter is defined as follows:

$$y(s) = \frac{[OC(f(s)) + CO(f(s))]}{2} \qquad (1)$$

in Formula (1), f(s) is a fundamental frequency characteristic sequence before filtering for each channel, without unit and in the form of a vector, and each characteristic sequence is directly obtained through signal collection and fast Fourier transform; y(s) is obtained by filtering the original characteristic sequence with the above-mentioned formula, without unit and in the form of a vector; OC is an open-closed morphological filtering form, and CO is a closed-open morphological filtering form.

* * * * *